US012662595B2

(12) United States Patent
Dai et al.

(10) Patent No.:  US 12,662,595 B2
(45) Date of Patent:      Jun. 23, 2026

(54) HALOGEN-FREE FLAME-RETARDANT POLYAMIDE (PA) COMPOSITE AND PREPARATION METHOD THEREOF

(71) Applicant: KINGFA SCI. & TECH. CO., LTD., Guangzhou (CN)

(72) Inventors: Jian Dai, Guangzhou (CN); Nanbiao Ye, Guangzhou (CN); Xianbo Huang, Guangzhou (CN); Chao Ding, Guangzhou (CN); Yiquan Zheng, Guangzhou (CN); Feng Wang, Guangzhou (CN); Yajun Zhang, Guangzhou (CN)

(73) Assignee: KINGFA SCI. & TECH. CO., LTD., Guangzhou (CN)

( * ) Notice: Subject to any disclaimer, the term of this patent is extended or adjusted under 35 U.S.C. 154(b) by 606 days.

(21) Appl. No.: 18/029,373

(22) PCT Filed: Feb. 23, 2021

(86) PCT No.: PCT/CN2021/077357
§ 371 (c)(1),
(2) Date: Mar. 29, 2023

(87) PCT Pub. No.: WO2022/068138
PCT Pub. Date: Apr. 7, 2022

(65) Prior Publication Data
US 2023/0365807 A1       Nov. 16, 2023

(30) Foreign Application Priority Data
Sep. 29, 2020    (CN) ......................... 202011047000.9

(51) Int. Cl.
| | |
|---|---|
| *C08L 77/06* | (2006.01) |
| *C08K 3/22* | (2006.01) |
| *C08K 3/32* | (2006.01) |
| *C08K 3/38* | (2006.01) |
| *C08K 5/06* | (2006.01) |
| *C08K 7/14* | (2006.01) |
| *C08K 13/04* | (2006.01) |

(52) U.S. Cl.
CPC ............... *C08L 77/06* (2013.01); *C08K 3/22* (2013.01); *C08K 3/32* (2013.01); *C08K 3/38* (2013.01); *C08K 5/06* (2013.01); *C08K 7/14*

(2013.01); *C08K 13/04* (2013.01); *C08K 2003/2227* (2013.01); *C08K 2003/327* (2013.01); *C08K 2003/387* (2013.01); *C08L 2201/02* (2013.01)

(58) Field of Classification Search
CPC ........... C08L 77/06; C08L 77/10; C08K 7/14; C08K 5/5313; C08K 3/22; C08K 3/38; C08K 5/06
See application file for complete search history.

(56) References Cited

U.S. PATENT DOCUMENTS

| | | | |
|---|---|---|---|
| 2013/0217814 A1* | 8/2013 | Yu ........................... | C09K 21/12 524/133 |
| 2021/0268726 A1* | 9/2021 | Gabriel ................... | C08L 77/06 |

FOREIGN PATENT DOCUMENTS

| | | |
|---|---|---|
| CN | 102093706 A | 6/2011 |
| CN | 102464881 A | 5/2012 |
| CN | 105283510 A | 1/2016 |
| CN | 107810239 A | 3/2018 |
| EP | 3587085 A1 | 1/2020 |

OTHER PUBLICATIONS

International search report of PCT Patent Application No. PCT/CN2021/077357 issued on Jul. 1, 2021.

* cited by examiner

*Primary Examiner* — Randy P Gulakowski
*Assistant Examiner* — Audra J Destefano

(57) ABSTRACT

A halogen-free flame-retardant polyamide (PA) composite includes the following components in parts by weight: 20 to 50 parts of an aliphatic PA, 10 to 30 parts of an aromatic PA, 20 to 30 parts of a halogen-free flame retardant, 10 to 50 parts of a glass fiber, 1 to 5 parts of a char-forming agent, and 0 to 5 parts of an additive, where the aromatic PA is at least one selected from the group consisting of PA66/6T, PA MXD6, and PA6T/6I and the char-forming agent is at least one selected from the group consisting of dipentaerythritol (DPE) and tripentaerythritol (TPE). In the halogen-free flame-retardant PA composite, the aromatic PA itself has high-temperature resistance and aging resistance and exhibits a synergistic effect with a dense carbon layer formed by the char-forming agent during aging. The present disclosure discloses a preparation method of the halogen-free flame-retardant PA composite.

14 Claims, No Drawings

HALOGEN-FREE FLAME-RETARDANT POLYAMIDE (PA) COMPOSITE AND PREPARATION METHOD THEREOF

TECHNICAL FIELD

The present disclosure relates to the field of polymer modification, and in particular to a halogen-free flame-retardant polyamide (PA) composite and a preparation method thereof.

BACKGROUND

Halogen-free flame-retardant PA materials are widely used in electronics, electricity, automotive, and other industries, and have excellent comprehensive mechanical performance, heat resistance, among others. Although the requirements of manufacturing terminals for materials have improved with the gradual rise of miniaturization and integration trends, the existing products are unable to satisfy the pertinent demands in terms of aging resistance and weather resistance, which has become one of the key factors limiting the application of such products. Only a very slight improvement can be shown when using a conventional antioxidant system for optimization. Thus, it is essential to efficiently enhance the material's performance through the optimization of the entire formulation system.

SUMMARY

In view of the above, an objective of the present disclosure is to overcome the shortcomings of the prior art and provide a halogen-free flame-retardant PA composite with high weather and aging resistance.

To achieve the above objective, the present disclosure adopts the following technical solutions: A halogen-free flame-retardant PA composite is provided, including the following components in parts by weight: 20 to 50 parts of an aliphatic PA, 10 to 30 parts of an aromatic PA, 20 to 30 parts of a halogen-free flame retardant, 10 to 50 parts of a glass fiber, 1 to 5 parts of a char-forming agent, and 0 to 5 parts of an additive, where the aromatic PA is at least one selected from the group consisting of PA66/6T, PA MXD6, and PA6T/61 and the char-forming agent is at least one selected from the group consisting of dipentaerythritol (DPE) and tripentaerythritol (TPE).

In the halogen-free flame-retardant PA composite of the present disclosure, a specific aromatic PA and a specific char-forming agent are added. The aromatic PA itself has high-temperature resistance and aging resistance and exhibits a synergistic effect with a dense carbon layer formed by the char-forming agent during aging. As a result, the halogen-free flame-retardant PA composite has excellent weather resistance, aging resistance, and flame retardation.

Preferably, the aromatic PA is at least one selected from the group consisting of PA66/6T and PA6T/61; and the char-forming agent is DPE.

Preferably, the aliphatic PA is at least one selected from the group consisting of PA6, PA 46, PA 66, PA56, and PA610.

More preferably, the aliphatic PA is PA 66.

Preferably, the halogen-free flame retardant is a mixture of aluminum diethylphosphinate (ADP), boehmite, and zinc borate, and the ADP, the boehmite, and the zinc borate are in a weight ratio of (15-16):(4-5):(2-3).

Preferably, the glass fiber is at least one selected from the group consisting of E-glass fiber, H-glass fiber, R,S-glass fiber, D-glass fiber, C-glass fiber, and a quartz glass fiber.

Preferably, the halogen-free flame-retardant PA composite includes the following components in parts by weight: 20 to 50 parts of the aliphatic PA, 15 to 25 parts of the aromatic PA, 20 to 30 parts of the halogen-free flame retardant, 10 to 50 parts of the glass fiber, 1.5 to 3 parts of the char-forming agent, and 0 to 5 parts of the additive.

Preferably, the additive is at least one selected from the group consisting of an antioxidant and a lubricant; the antioxidant is a hindered phenol antioxidant; and the lubricant is at least one selected from the group consisting of a higher fatty acid, a higher fatty acid metal salt, a higher fatty acid ester, and a higher fatty acid amide.

The hindered phenol antioxidant may be, for example, octadecyl 3-(3',5'-di-tert-butyl-4-hydroxyphenyl)propionate, octadecyl 3-(3'-methyl-5-tert-butyl-4'-hydroxyphenyl)propionate, tetradecyl 3-(3',5'-di-tert-butyl-4'-hydroxyphenyl)propionate, 1,6-hexanediol bis(3-(3,5-di-tert-butyl-4-hydroxyphenyl)propionate), tetrakis(methylene-3-(3',5'-di-tert-butyl-4'-hydroxyphenyl)propionate)methane, 3,9-bis(2-(3-(3-tert-butyl-4-hydroxy-5-methylphenyl)propionyloxy)-1,1-dimethylethyl)-2,4,8,10-tetraoxaspiro(5,5)undecane, and N,N'-bis-(3-(3,5-di-tert-butyl-4-hydroxyphenyl)propionyl)hexanediamine.

The present disclosure also provides a preparation method of the halogen-free flame-retardant PA composite, including pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, where a screw of the twin-screw extruder has a length-to-diameter ratio of 40:1 to 48:1; the glass fiber is fed at a side of sections 5 to 6 of the screw; a temperature of a screw cylinder is 240° C. to 300° C.; and a rotational speed of the screw is 300 rpm to 500 rpm.

The present disclosure also discloses use of the halogen-free flame-retardant PA composite in an automotive material.

Compared with the prior art, the present disclosure has the following beneficial effects:

In the halogen-free flame-retardant PA composite of the present disclosure, a specific aromatic PA and a specific char-forming agent are added. The aromatic PA has high-temperature resistance and aging resistance and exhibits a synergistic effect with a dense carbon layer formed by the char-forming agent during aging. As a result, the halogen-free flame-retardant PA composite has excellent weather resistance, aging resistance, and flame retardation.

DETAILED DESCRIPTION

To better illustrate the objective, technical solutions, and advantages of the present disclosure, the present disclosure will be further described below in conjunction with specific examples. The following examples are merely typical examples of the present disclosure, and the protection scope of the present disclosure is not limited thereto.

Performance tests in the following examples and comparative examples are performed as follows:

(1) Flame retardation: A sample with a thickness of 0.8 mm is put through a flame retardation test in accordance with UL 94-2018. UL94-2018 rating V-0 is required because flame retardation is extremely important for electrical safety.

(2) Aging resistance: According to the guidelines and procedures of UL 746B 2018, an aging resistance test is carried out at an aging temperature of 230° C. aging temperature. An ISO 527-2 1BA sample with a thickness of 0.8 mm is chosen as the test sample, and the amount of time it takes for tensile strength to degrade to 50% of its initial performance is recorded as an evaluation metric for aging resistance.

(3) Weather resistance: weather resistance is tested and evaluated in accordance with Cycle 4892-2, where a test sample is a flat member; and a color difference AE before and after xenon lamp aging is recorded as an evaluation index.

Materials used in the examples and comparative examples are as follows:

aliphatic PA: PA resin A1: PA66 EP-158 by Huafon Group;

aliphatic PA: PA resin A2: PA56 by Shandong Cathay;

aliphatic PA: PA resin A3: PA610 F150 by Shandong Guangyin New Materials Co., Ltd.;

aromatic PA: PA resin B: PA 6T/6I, Selar PA 3462R by Dupont;

aromatic PA: PA resin C: PA66/6T, C1504T by Shandong Guangyin New Materials Co., Ltd.;

aromatic PA: PA resin D: PAMXD6 by Shanghai Ingoo Chemical Co. Ltd.;

aromatic PA: PA resin E: PA6I by Shandong Xianglong New Materials Corp.;

Halogen-free flame retardant:

ADP: OP1230 (mass percentage of phosphorus 23% to 24%) by Clariant AG;

boehmite: BG-613S0 by Estone Materials Technology Co., ltd.;

zinc borate: ZB-500 by Chengdu Kaifei High Energy Chemical Industry Co., Ltd.;

antioxidant: hindered phenol antioxidant: N,N'-bis-(3-(3, 5-di-tert-butyl-4-hydroxyphenyl)propionyl)hexanedi-amine, IRGANOX 1098 by BASF SE;

lubricant: higher fatty acid ester, LOXIOL G 32 by Emery Oleochemicals;

glass fiber: ECS11-4.5-560A, E-glass fiber with a diameter of 11 China JuShi Co., Ltd.;

char-forming agent:

DPE: CHARMOR DP40 by Perstorp;

TPE: Sigma-Aldrich, Merck; and pentaerythritol: Hubei Yihua Group Co., Ltd.

A preparation method of the halogen-free flame-retardant PA composites in the examples of the present disclosure was as follows: the components other than the glass fiber were pre-mixed in a high-speed mixer to obtain a premix, the premix was subjected to melt-mixing in a twin-screw extruder, and extrusion granulation was conducted, where a screw of the twin-screw extruder had a length-to-diameter ratio of 40:1 (the glass fiber was fed at a side of sections 5 to 6 of the screw); a temperature of a screw cylinder was 240° C. to 300° C.; and a rotational speed of the screw was 300 rpm; and a PA composite obtained from the extrusion granulation was subjected to injection-molding at a temperature of 280° C. and a pressure of 70 MPa to obtain the halogen-free flame-retardant PA composite.

The present disclosure comprises Examples 1 to 14 and Comparative Examples 1 to 8. The components and performance data of Examples 1 to 7 are shown in Table 1; the components and performance data of Examples 8 to 14 are shown in Table 2; and the components and performance data of Comparative Examples 1 to 8 are shown in Table 3.

TABLE 1

Components and performance data of Examples 1 to 7

| | Example 1 | Example 2 | Example 3 | Example 4 | Example 5 | Example 6 | Example 7 |
|---|---|---|---|---|---|---|---|
| PA resin A1 (parts by weight) | 39.5 | 0 | 0 | 29.5 | 29.5 | 29.5 | 29.5 |
| PA resin A2 (parts by weight) | 0 | 39.5 | 0 | 0 | 0 | 0 | 0 |
| PA resin A3 (parts by weight) | 0 | 0 | 39.5 | 0 | 0 | 0 | 0 |
| PA resin B (parts by weight) | 10 | 10 | 10 | 20 | 0 | 0 | 20 |
| PA resin C (parts by weight) | 0 | 0 | 0 | 0 | 20 | 0 | 0 |
| PA resin D (parts by weight) | 0 | 0 | 0 | 0 | 0 | 20 | 0 |
| Halogen-free flame retardant — ADP (parts by weight) | 16 | 16 | 16 | 16 | 16 | 16 | 16 |
| Boehmite (parts by weight) | 5 | 5 | 5 | 5 | 5 | 5 | 5 |
| Zinc borate (parts by weight) | 2 | 2 | 2 | 2 | 2 | 2 | 2 |
| Glass fiber (parts by weight) | 25 | 25 | 25 | 25 | 25 | 25 | 25 |
| DPE (parts by weight) | 2 | 2 | 2 | 2 | 2 | 2 | 0 |
| TPE (parts by weight) | 0 | 0 | 0 | 0 | 0 | 0 | 2 |
| Lubricant LOXIOL G 32 (parts by weight) | 0.3 | 0.3 | 0.3 | 0.3 | 0.3 | 0.3 | 0.3 |
| Antioxidant IRGANOX 1098 (parts by weight) | 0.2 | 0.2 | 0.2 | 0.2 | 0.2 | 0.2 | 0.2 |
| Flame retardation (0.8 mm) | V-0 | V-0 | V-0 | V-0 | V-0 | V-0 | V-0 |
| Aging resistance, time (h) required for performance degradation to 50% | 2500 | 2030 | 1850 | 3890 | 3750 | 3650 | 3540 |
| Weather resistance, color difference ΔE before and after xenon lamp aging | 12.1 | 13.6 | 13.2 | 10.8 | 11.7 | 11.9 | 13.3 |

TABLE 2

Components and performance data of Examples 8 to 14

| | Example 8 | Example 9 | Example 10 | Example 11 | Example 12 | Example 13 | Example 14 |
|---|---|---|---|---|---|---|---|
| PA resin A1 (parts by weight) | 29.5 | 29.5 | 29.5 | 20 | 29.5 | 29.5 | 29.5 |
| PA resin B (parts by weight) | 20 | 20 | 20 | 29.5 | 26 | 15 | 25 |

TABLE 2-continued

Components and performance data of Examples 8 to 14

| | | Example 8 | Example 9 | Example 10 | Example 11 | Example 12 | Example 13 | Example 14 |
|---|---|---|---|---|---|---|---|---|
| Halogen-free flame retardant | ADP (parts by weight) | 16 | 14 | 17 | 16 | 16 | 16 | 16 |
| | Boehmite (parts by weight) | 4 | 6 | 3 | 5 | 5 | 5 | 5 |
| | Zinc borate (parts by weight) | 3 | 3 | 3 | 2 | 2 | 2 | 2 |
| Glass fiber (parts by weight) | | 25 | 25 | 25 | 25 | 25 | 25 | 25 |
| DPE (parts by weight) | | 2 | 2 | 2 | 2 | 1 | 1.5 | 3 |
| Lubricant LOXIOL G 32 (parts by weight) | | 0.3 | 0.3 | 0.3 | 0.3 | 0.3 | 0.3 | 0.3 |
| Antioxidant IRGANOX 1098 (parts by weight) | | 0.2 | 0.2 | 0.2 | 0.2 | 0.2 | 0.2 | 0.2 |
| Flame retardation (0.8 mm) | | V-0 | V-0 | V-0 | V-0 | V-0 | V-0 | V-0 |
| Aging resistance, time (h) required for performance degradation to 50% | | 3800 | 3740 | 3650 | 3860 | 3450 | 3640 | 3980 |
| Weather resistance, color difference ΔE before and after xenon lamp aging | | 11.1 | 12.3 | 12.2 | 11.0 | 12.1 | 11.8 | 10.7 |

TABLE 3

Components and performance data of Comparative Examples 1 to 8

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| PA resin Al (parts by weight) | | 51.5 | 41.5 | 31.5 | 49.5 | 44.5 | 41 | 29.5 | 29.5 |
| PA resin B (parts by weight) | | 0 | 10 | 20 | 0 | 5 | 10 | 0 | 20 |
| PA resin E (parts by weight) | | 0 | 0 | 0 | 0 | 0 | 0 | 20 | 0 |
| Halogen-free flame retardant | ADP (parts by weight) | 16 | 16 | 16 | 16 | 16 | 16 | 16 | 16 |
| | Boehmite (parts by weight) | 5 | 5 | 5 | 5 | 5 | 5 | 5 | 5 |
| | Zinc borate (parts by weight) | 2 | 2 | 2 | 2 | 2 | 2 | 2 | 2 |
| Glass fiber (parts by weight) | | 25 | 25 | 25 | 25 | 25 | 25 | 25 | 25 |
| DPE (parts by weight) | | 0 | 0 | 0 | 2 | 2 | 0.5 | 2 | 0 |
| Pentaerythritol (parts by weight) | | 0 | 0 | 0 | 0 | 0 | 0 | 0 | 2 |
| Lubricant LOXIOL G 32 (parts by weight) | | 0.3 | 0.3 | 0.3 | 0.3 | 0.3 | 0.3 | 0.3 | 0.3 |
| Antioxidant IRGANOX 1098 (parts by weight) | | 0.2 | 0.2 | 0.2 | 0.2 | 0.2 | 0.2 | 0.2 | 0.2 |
| Flame retardation (0.8 mm) | | V-2 | V-1 | V-0 | V-2 | V-1 | V-1 | V-0 | V-1 |
| Aging resistance, time (h) required for performance degradation to 50% | | 420 | 780 | 1200 | 630 | 800 | 1420 | 1870 | 650 |
| Weather resistance, color difference ΔE before and after xenon lamp aging | | 20.6 | 18.4 | 14.3 | 19.2 | 17.7 | 16.0 | 15.8 | 22.3 |

It can be seen from the comparison of Examples 1 to 3 that the aliphatic PA in Example 1 is PA 66, and the aging resistance and weather resistance of Example 1 are better than those of Examples 2 and 3.

It can be seen from the comparison of Examples 4 to 6 that the aromatic PA in Example 4 is PA 6T/6I, the aromatic PA in Example 5 is PA66/6T, and the aromatic PA in Example 6 is PA MXD6. The aging resistance and weather resistance of Examples 4 and 5 are better than those of Example 6.

It can be seen from the comparison of Example 4 with Example 7 that the char-forming agent in Example 4 is DPE and the char-forming agent in Example 7 is TPE. The aging resistance and weather resistance of Example 4 are better than those of Example 7.

It can be seen from the comparison of Examples 4, 8, 9 and 10 that in Examples 4 and 8, ADP, boehmite, and zinc borate are in a weight ratio of (15-16):(4-5):(2-3); whereas in Examples 9-10, ADP, boehmite, and zinc borate are not in the weight ratio of (15-16):(4-5):(2-3). The aging resistance and weather resistance of Examples 4 and 8 are better than those of Examples 9 and 10.

By comparing Examples 4, 13, and 14 with Example 12, it can be seen that in Examples 4, 13, and 14 each comprise 15-25 parts of an aromatic PA and 1.5-3 parts of a char-forming agent. In contrast, Example 12 does not comprise 15-25 parts of an aromatic PA and 1.5-3 parts of a char-forming agent. The aging resistance and weather resistance of Examples 4, 13, and 14 are better than those of Example 12.

It can be seen from the comparison of Example 4 with Comparative Examples 1 to 8 that, in the absence of an aromatic PA and a char-forming agent, or in the presence of only one of the aromatic PA and the char-forming agent, or in the presence of both the aromatic PA and the char-forming agent but at amounts outside the preferred ranges, the aging resistance, weather resistance, and flame retardation of the material are significantly worse than those of Example 4 of the present disclosure.

Finally, it should be noted that the above embodiments are provided merely to describe the technical solutions of the present disclosure, rather than to limit the protection scope of the present disclosure. Although the present disclosure is described in detail with reference to preferred embodiments, a person of ordinary skill in the art should understand that modifications or equivalent replacements may be made to the technical solutions of the present disclosure without departing from the spirit and scope of the technical solutions of the present disclosure.

The invention claimed is:

1. A halogen-free flame-retardant polyamide (PA) composite, comprising the following components in parts by weight: 20 to 50 parts of an aliphatic PA, 10 to 30 parts of an aromatic PA, 20 to 30 parts of a halogen-free flame retardant, 10 to 50 parts of a glass fiber, 1 to 5 parts of a char-forming agent, and 0 to 5 parts of an additive, wherein the aromatic PA is at least one selected from the group consisting of PA66/6T, PA MXD6, and PA6T/6I; and the char-forming agent is at least one selected from the group consisting of dipentaerythritol (DPE) and tripentaerythritol (TPE); and wherein the halogen-free flame retardant is a mixture of aluminum diethylphosphinate (ADP), boehmite, and zinc borate, and the ADP, the boehmite, and the zinc borate are in a weight ratio of (15-16): (4-5): (2-3).

2. The halogen-free flame-retardant PA composite according to claim 1, wherein the aromatic PA is at least one selected from the group consisting of PA66/6T and PA6T/6I; and the char-forming agent is DPE.

3. The halogen-free flame-retardant PA composite according to claim 1, wherein the aliphatic PA is at least one selected from the group consisting of PA6, PA 46, PA 66, PA56, and PA610.

4. The halogen-free flame-retardant PA composite according to claim 3, wherein the aliphatic PA is PA 66.

5. The halogen-free flame-retardant PA composite according to claim 1, wherein the glass fiber is at least one selected from the group consisting of E-glass fiber, H-glass fiber, R,S-glass fiber, D-glass fiber, C-glass fiber, and a quartz glass fiber.

6. The halogen-free flame-retardant PA composite according to claim 1, comprising the following components in parts by weight: 20 to 50 parts of the aliphatic PA, 15 to 25 parts of the aromatic PA, 20 to 30 parts of the halogen-free flame retardant, 10 to 50 parts of the glass fiber, 1.5 to 3 parts of the char-forming agent, and 0 to 5 parts of the additive.

7. The halogen-free flame-retardant PA composite according to claim 1, wherein the additive is at least one selected from the group consisting of an antioxidant and a lubricant; the antioxidant is a hindered phenol antioxidant; and the lubricant is at least one selected from the group consisting of a higher fatty acid, a higher fatty acid metal salt, a higher fatty acid ester, and a higher fatty acid amide.

8. A preparation method of the halogen-free flame-retardant PA composite according to claim 1, comprising: pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, wherein a screw of the twin-screw extruder has a length-to-diameter ratio of 40:1 to 48:1; a temperature of a screw cylinder is 240° C. to 300° C.; and a rotational speed of the screw is 300 rpm to 500 rpm.

9. A preparation method of the halogen-free flame-retardant PA composite according to claim 2, comprising: pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, wherein a screw of the twin-screw extruder has a length-to-diameter ratio of 40:1 to 48:1; a temperature of a screw cylinder is 240° C. to 300° C.; and a rotational speed of the screw is 300 rpm to 500 rpm.

10. A preparation method of the halogen-free flame-retardant PA composite according to claim 3, comprising: pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, wherein a screw of the twin-screw extruder has a length-to-diameter ratio of 40:1 to 48:1; a temperature of a screw cylinder is 240° C. to 300° C.; and a rotational speed of the screw is 300 rpm to 500 rpm.

11. A preparation method of the halogen-free flame-retardant PA composite according to claim 4, comprising: pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, wherein a screw of the twin-screw extruder has a length-to-diameter ratio of 40:1 to 48:1; a temperature of a screw cylinder is 240° C. to 300° C.; and a rotational speed of the screw is 300 rpm to 500 rpm.

12. A preparation method of the halogen-free flame-retardant PA composite according to claim 6, comprising: pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, wherein a screw of the twin-screw extruder has a length-to-diameter ratio of 40:1 to 48:1; a temperature of a screw cylinder is 240° C. to 300° C.; and a rotational speed of the screw is 300 rpm to 500 rpm.

13. A preparation method of the halogen-free flame-retardant PA composite according to claim 7, comprising: pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, wherein a screw of the twin-screw extruder has a length-to-diameter ratio of 40:1 to 48:1; a temperature of a screw cylinder is 240° C. to 300° C.; and a rotational speed of the screw is 300 rpm to 500 rpm.

14. A preparation method of the halogen-free flame-retardant PA composite according to claim 8, comprising: pre-mixing the components other than the glass fiber in a high-speed mixer to obtain a premix, subjecting the premix to melt-mixing with the glass fiber in a twin-screw extruder, and conducting extrusion granulation; and subjecting a PA material obtained from the extrusion granulation to injection-molding to obtain the halogen-free flame-retardant PA composite, wherein a screw of the twin-screw extruder has a length-to-diameter ratio of 40:1 to 48:1; a temperature of a screw cylinder is 240° C. to 300° C.; and a rotational speed of the screw is 300 rpm to 500 rpm.

\* \* \* \* \*